Oct. 27, 1936.  G. TRIPPE  2,058,743
BEAM LEVEL INDICATOR FOR AUTOMOBILE HEAD LAMPS
Filed Aug. 20, 1935
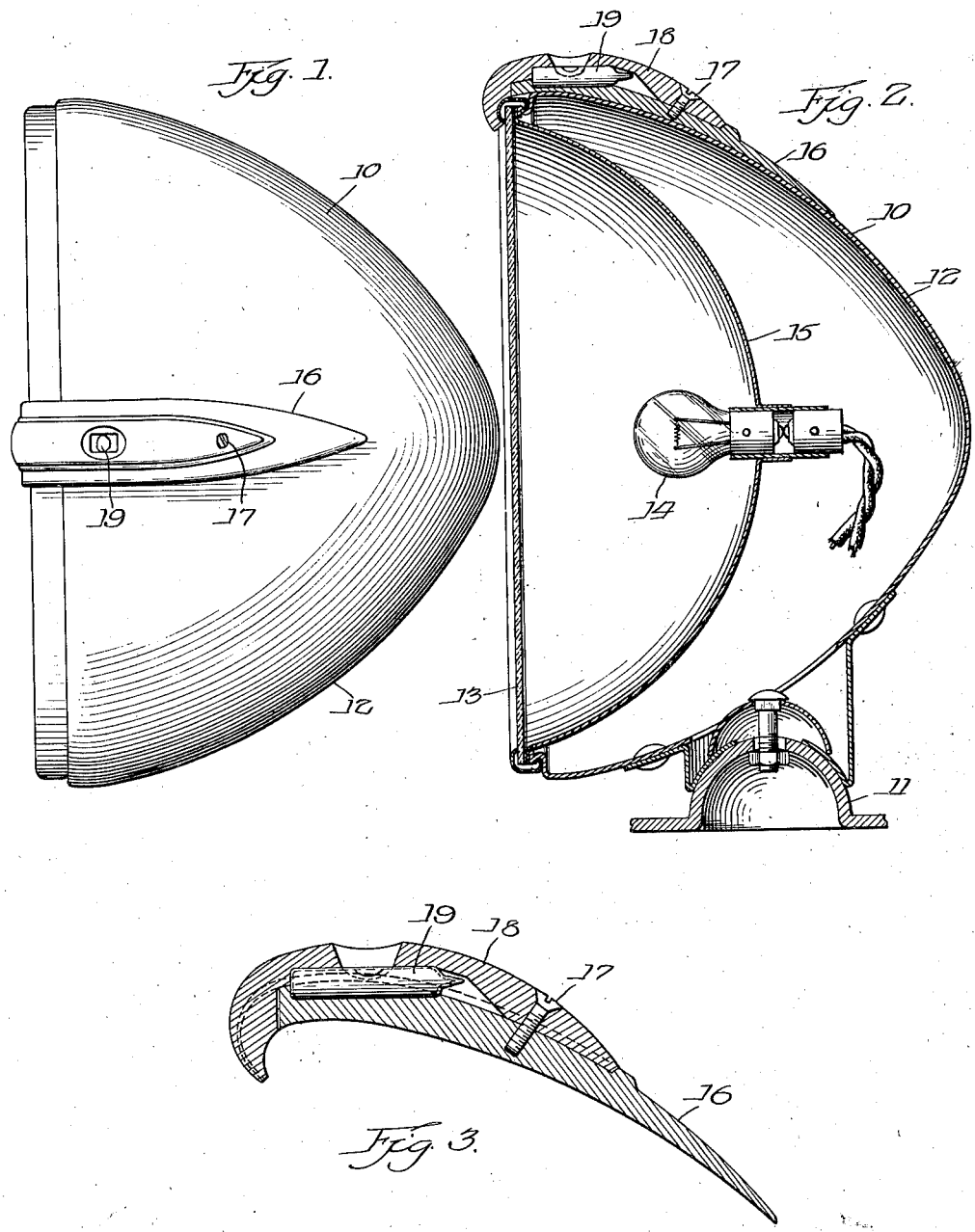
Inventor:
Graham Trippe
By James R. McKnight
Attorney Patented Oct. 27, 1936

2,058,743

UNITED STATES PATENT OFFICE 2,058,743

BEAM LEVEL INDICATOR FOR AUTOMOBILE HEAD LAMPS

Graham Trippe, Chicago, Ill.

Application August 20, 1935, Serial No. 37,005

2 Claims. (Cl. 33—211)

My invention relates to an automobile head lamp in combination with a beam level indicator.

In connecting a head lamp to an automobile it is essential to so position the lamp that the horizontal top cutoff of the beam therefrom is at the same level as the center of the lamp itself. If the beam is on a lower level it is too close to the road, loses distance and does not give the proper visibility. If the beam is too high it glares into the eyes of drivers of approaching cars. This latter defect is unlawful in every jurisdiction and presents a great problem of enforcement to the authorities. In some communities correction has become compulsory, requiring drivers to check their head lamps periodically at adjustment stations or in safety lanes.

Even in the adjustment stations and in the conventional automobile shop adjustment of the lamp involves the use of awkward and expensive means. It is customary to provide a dark room wherein the light is adjusted by means of aiming it on screens.

Heretofore in the art wherever a spirit level was used it has been attached to the light socket inside of the housing where it has been inaccessible and not visible without removing the lens and taking the lamp apart. This combination of attaching the spirit level to a light socket was employed in combination with a tiltable reflector. Since tiltable or removable reflectors are now obsolete this combination is not pertinent to the present day type of automobile head lamps wherein the reflector remains in fixed position.

Among the objects of my invention are to provide an automobile head lamp pivotally mounted to an automobile, said automobile head lamp having a fixed reflector and carrying externally on its housing visible means for indicating the proper adjustment of said automobile head lamp so that the horizontal top cutoff of the beam therefrom is at approximately the same level of the center as the center of the automobile head lamp itself; to create means for the proper adjustment of the level of the beam without the necessity of a dark room or screens, and to supply a structure externally accessible and visible which the motorist himself, or the authorities, may use at any time or place to determine whether his beam is level or needs correcting and which will inform the motorist during the adjustment when he has adjusted the lamp so that its beam is at the proper level, and such other objects, advantages and capabilities as will later more fully appear and which are inherently possessed by my invention.

While I have shown in the accompanying drawing a preferred embodiment of my invention yet I wish it understood that the same is susceptible of modification and change without departing from the spirit of my invention.

Referring more particularly to the drawing, Fig. 1 is a top plan view and Fig. 2 is a sectional view of my beam level indicator for automobile head lamps, and Fig. 3 is an enlarged sectional view of the beam level indicator as it is applied in a preferred form to my automobile head lamp.

Referring more particularly to the embodiment selected to illustrate my invention, it comprises an automobile head lamp 10 pivotally mounted to a head lamp post 11, said automobile head lamp 10 having a housing 12, a lens 13, an electric light bulb 14 connected to an electrical source of supply, and a fixed reflector 15, said reflector 15 vertically mounted with respect to the axis of the housing 12. Preferably at the top of the housing 12 I provide a support member 16 attached to the housing 12 by suitable means such as brazing or the like. Attached to said support member 16 by a screw 17 is a casing 18 holding a spirit level 19.

In use the spirit level 19, being on the same horizontal plane as the beam of the lamp, will indicate by the bubble in the spirit level when the beam is at different levels. In this way the motorist can always tell whether his beam is properly directed and he can adjust the lamp until the spirit level indicates that the beam level is properly directed.

Having thus described my invention, I claim:

1. In combination with an automobile head lamp having a casing, means for producing a beam, and a fixed reflector, a beam level indicator comprising a holder shaped to conform to the contour of the outside top portion of the casing of the head lamp, and a spirit level permanently attached to said holder, said holder permanently positioned so as to be visible and accessible at all times on the exterior of said casing at substantially the top portion thereof, with the axis of said spirit level parallel to the upper boundary of the beam of light emitted from the reflector.

2. In combination with an automobile head lamp having a casing, means for producing a beam, and a fixed reflector, a beam level indicator comprising a support shaped to conform to the contour of and permanently attached to the outside top portion of the casing of the head lamp, a holder conforming in shape to the outside top portion of said casing attached to said support, a spirit level permanently held by said holder at substantially the top portion of said casing so that proper adjustment of the beam level may be directly determined without the need of extraneous apparatus or conditions.

GRAHAM TRIPPE.